J. CURZON.

Assignor of one-third Interest to S. H. GRAY.

LAMP-BURNER.

No. 7,412. Reissued Dec. 5, 1876.

WITNESSES:

Chas. Nida.

John Goodwals.

INVENTOR:

J. Curzon.

BY Munn & Co.

ATTORNEYS.

THE GRAPHIC CO. N.Y.

UNITED STATES PATENT OFFICE.

JAMES CURZON, OF DARIEN, CONNECTICUT, ASSIGNOR OF ONE-THIRD INTEREST TO STEPHEN H. GRAY.

IMPROVEMENT IN LAMP-BURNERS.

Specification forming part of Letters Patent No. 158,254, dated December 29, 1874; reissue No. 7,412, dated December 5, 1876; application filed September 30, 1876.

*To all whom it may concern:*

Be it known that I, JAMES CURZON, of Darien, in the county of Fairfield and State of Connecticut, have invented a new and Improved Lamp-Burner, of which the following is a specification:

The object of this invention is to increase the lighting capacity of petroleum and other lamps by a superior combustion of the oil-vapors; and the invention relates more especially to improvements in the construction of the wick-tubes and dome, by which a star-shaped light of increased candle-power is afforded.

The invention consists of a burner with angular wick-tubes, arranged to extend radially from the center of the burner, so as to form a star-shaped flame, in connection with a correspondingly-recessed dome above the same.

Figure 1:
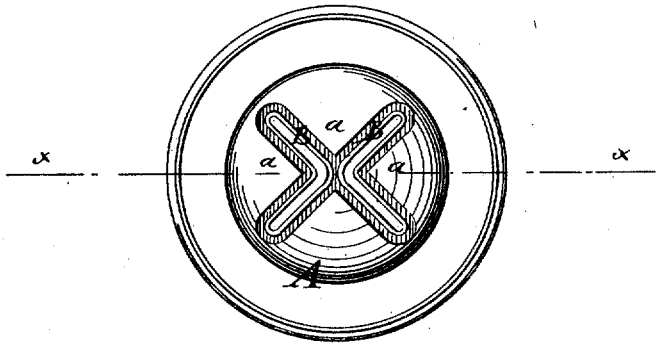
Figure 2:
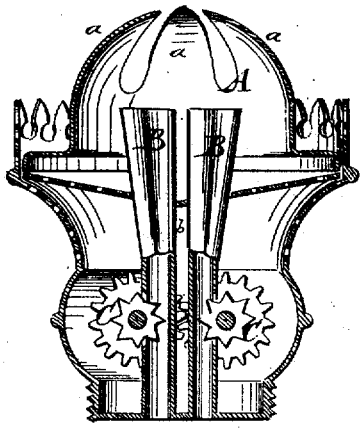

In the accompanying drawing, Figure 1 represents a plan view, showing the form of the wick-tubes; and Fig. 2 is a vertical central section of the same on the line *x x*, Fig. 1.

Similar letters of reference indicate corresponding parts.

A in the drawing represents the cone, B B the wick-tubes, and C the spurred wheels for raising or lowering the wicks, the wheels being arranged in any suitable manner, according to the relative position of the wick-tubes. The wick-tubes B are bent longitudinally, either at their upper parts or throughout their entire length, into rectangular or other form. The angles of the wick-tubes are placed nearly or quite in contact with each other, so that the sections of the same radiate from the central part of the burner. The adjoining sections of the star-shaped flame form angular spaces, into which, by the increased heat issuing from the flame-sections, a quick and continuous flow of air is drawn from below, so as to furnish a sufficient quantity of oxygen for the thorough combustion of the oil-vapors, and increase, consequently, the lighting capacity of the flame. The flame presents in every position of the lamp two sides from which light is radiated, and it disperses, by its star-shaped form, the light in more effective manner for use than either a straight or circular flame. The wick-tubes may also be made of arc shape, with their convex sides placed in contact, or nearly so, with each other. In this arrangement the result is nearly the same, as also a star-shaped light is produced; but the angular radiating wick-tubes are preferable to the curved tubes. The dome of the burner is arranged with recesses *a* radiating from the center, and corresponding to the disposition of the wick-tubes, so as to admit and assist in the formation of a star-shaped light of increased power. The air passing in at the apertures *c* finds its way through the holes *d* and along the space *b* to the flame, thus forming a central draft, that carries an ample supply of oxygen to support combustion.

Having thus described my invention, I claim as new and desire to secure by Letters Patent—

1. A lamp-burner having a central draft, and made of wick-tubes with radial sections, to form a star-shaped flame, substantially as and for the purpose described.

2. A lamp-burner having a central draft, and composed of angular wick-tubes, with sections radiating from the center of the burner, substantially as described.

3. The combination, with a lamp-burner having a central draft and radial wick-tubes, of the dome A, constructed in conical form and with recesses *a*, as and for the purpose specified.

4. The angularly-bent wick-tubes B B, being placed with their angles contiguous to each other, as shown and described.

JAMES CURZON.

Witnesses:

C. SEDGWICK,

ALEX. F. ROBERTS.